United States Patent [19]

Nagasaki et al.

[11] Patent Number: 4,740,345

[45] Date of Patent: Apr. 26, 1988

[54] METHOD FOR PRODUCING AN IRON GOLF CLUB HEAD

[75] Inventors: Yoichi Nagasaki; Toyohiko Tadokoro; Tatsuo Nakanishi; Masaki Fujimura, all of Hamamatsu, Japan

[73] Assignee: Nippon Gakki Seizo Kabushiki Kaisha, Japan

[21] Appl. No.: 921,608

[22] Filed: Oct. 20, 1986

[30] Foreign Application Priority Data

Oct. 22, 1985 [JP] Japan ................ 60-235832
Oct. 22, 1985 [JP] Japan ................ 60-235833

[51] Int. Cl.⁴ ............... B29C 43/18; B29C 43/20; B29C 43/42; B29C 43/52
[52] U.S. Cl. ...................... 264/257; 29/527.4; 264/258; 264/265; 264/268; 264/318; 264/319; 264/324; 264/325; 273/167 R; 273/167 H; 273/173; 273/DIG. 7
[58] Field of Search ............ 264/257, 258, 265, 268, 264/319, 324, 325, 274, 325, 274, 318; 273/78, 167 R, 167 F, 167 H, 173, DIG. 7, DIG. 23; 29/527.4

[56] References Cited

U.S. PATENT DOCUMENTS

| | | | |
|---|---|---|---|
| 3,047,934 | 8/1962 | Magner, Jr. | 264/265 X |
| 3,855,029 | 12/1974 | Sabel | 264/257 X |
| 4,027,885 | 6/1977 | Rogers | 273/173 X |
| 4,031,601 | 6/1977 | Staub et al. | 264/258 X |
| 4,067,950 | 1/1978 | Baruschke et al. | 264/257 |
| 4,248,817 | 2/1981 | Frank | 264/258 X |
| 4,260,576 | 4/1981 | Pollard | 264/257 |
| 4,271,112 | 6/1981 | Rossman et al. | 264/258 X |
| 4,356,617 | 11/1982 | Coscia | 29/527.4 |
| 4,449,707 | 5/1984 | Hayashi et al. | 273/167 H X |
| 4,451,041 | 5/1984 | Hayashi et al. | 273/167 H |
| 4,497,765 | 2/1985 | Wilde et al. | 264/268 |
| 4,555,115 | 11/1985 | You | 273/167 R |
| 4,581,190 | 4/1986 | Nagamoto et al. | 264/257 X |
| 4,591,155 | 5/1986 | Adachi | 264/258 X |

FOREIGN PATENT DOCUMENTS

| | | | |
|---|---|---|---|
| 54-38376 | 3/1979 | Japan | 264/257 |
| 58-29620 | 2/1983 | Japan | 264/257 |
| 59-109315 | 6/1984 | Japan | 264/257 |
| 1229904 | 4/1971 | United Kingdom | 264/257 |
| 2115295 | 9/1983 | United Kingdom | 273/167 H |
| 294750 | 4/1971 | U.S.S.R. | 264/265 |

Primary Examiner—Jeffery Thurlow
Assistant Examiner—Leo B. Tentoni
Attorney, Agent, or Firm—Lerner, David, Littenberg, Krumholz & Mentlik

[57] ABSTRACT

In production of a composite type iron golf club head having a FRP (fiber reinforced plastic) backing in a rear recess, a peripheral flange to be caught by the main body is formed on the FRP backing by providing a bottom peripheral groove in the rear recess for fortified bonding of the FRP backing to the main body.

7 Claims, 2 Drawing Sheets

METHOD FOR PRODUCING AN IRON GOLF CLUB HEAD

BACKGROUND OF THE INVENTION

The present invention relates to method for producing an iron golf club head, and more particularly relates to an improvement in the production of an iron golf club head with FRP backing.

Various types of iron golf club heads are available in the marketplace. In one example, an iron golf club head has a main body fully made of a metallic material such as stainless, cast iron and brass. In another example, an iron golf club head has a composite main body in which the sole and core made of metal is fully covered with FRP (fiber reinforced plastic), in particular with CFRP (carbon fiber reinforced plastic). In the case of this composite type, the face side covered with a FRP shell imposes high repellent to balls, thereby causing long distance shots. Further, the weight of the iron golf club head is greatly reduced and shooting direction of balls is significantly stabilized.

In the case of the fully metallic iron golf club head, limited properties of the metallic material cannot assure variety in feeling at shots. In addition, uniform specific gravity of the metallic material does not allow local weight adjustment and, as a consequence, adjustment of inertia moment.

In the case of the composite iron golf club head, the FRP shell on the face side is quite vulnerable to striking shock at shooting balls. Biased weight on the side of the sole causes unbalanced weight distribution with less contribution to adjustment of inertia moment.

In order to resolve the above problems, other inventions added a highly elastic backing containing reinforcing fibers to the face side of an iron golf club head. Such a metal-FRP composite structure well shields the FRP component against external attack and improves feeling at shots. The shift of weight saved by addition of the backing can be alloted to sections of the main body other than the face side, thereby enabling adjustment of inertia moment without any increase in weight.

In production of such a composite iron club head, a rear recess is formed in the surface of the main body opposite to the face side, a FRP plate is placed in and bonded to the rear recess. The FRP plate is locked into place by a presser ring in order to prevent fall of the FRP plate at shooting balls. Since presence of the recess causes reduction in weight of the main body, the thickness of the main body in the shooting direction can be increased without causing any substantial increase in weight. Thus, the weight of the main body may be dispersed off its center of gravity for easy adjustment of inertia moment.

Despite these merits, however, use of the solid FRP plate as a backing is inevitably accompanied with poor bonding between the two solid component, i.e. the iron main body and the FRP plate. This poor bonding seriously mars function of the FRP component in the composite structure. When the presser ring provides insufficient locking, the FRP plate in the rear recess tends to fall due to shock at shooting balls.

SUMMARY OF THE INVENTION

It is the object of the present invention to produce a composite iron club head with fortified bonding of a FRP backing.

In accordance with the present invention, a metallic main body is formed which has a rear recess and a peripheral groove surrounding the bottom of the rear recess, easily deformable crude resin containing reinforcing fiberous material is filled in the rear recess and the groove, and the crude material is hardened by application of heat under pressure.

DESCRIPTION OF THE PREFERRED EMBODIMENTS

Figure 1:
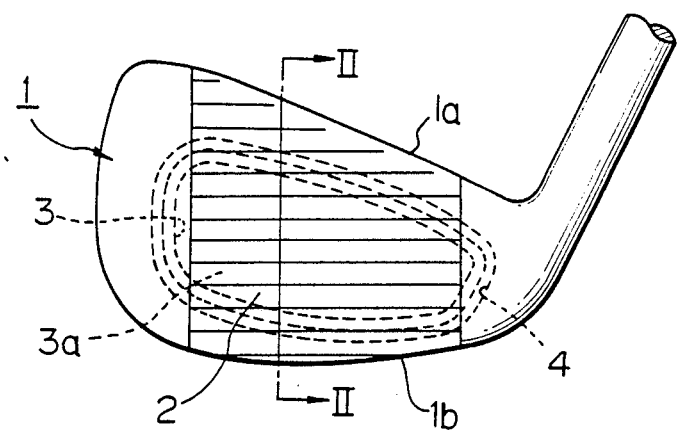
FIG. 1 is a front view of one example of the iron golf club head produced in accordance with the present invention.
Figure 2:
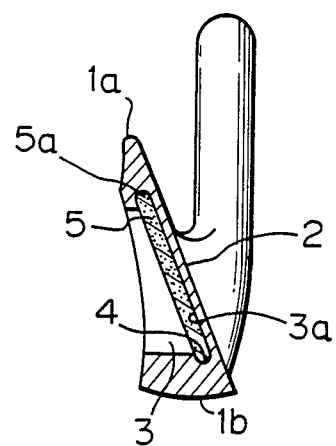
FIG. 2 is a section taken along a line II-II in FIG. 1, FIGS. 3 to 5 are side sectional views for showing sequential steps in one embodiment of the method of the present invention.

The composite iron golf club head shown in FIGS. 1 and 2 includes a main body 1 made of a metallic material such as stainless steel, cast iron or brass. In the surface of the main body 1 opposite to a face side is formed a recess 3 in a manner such that the thickness of the face side 2 in the shooting direction should be smaller than those of the top 1a and sole 1b of the main body 1. The recess 3 has a substantially flat bottom 3a which is surrounded by a peripheral groove 4. The peripheral groove 4 and the section of the recess 3 surrounded by the groove 4 are filled with a FRP backing 5.

Figure 3:
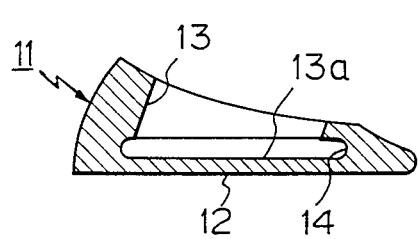

In the first step of the method in accordance with the present invention, a main body 11 such as shown in FIG. 3 is formed of a proper metallic material. This main body 11 includes a face side 12, a recess 13 formed in the surface opposite to the face side 12 and having a substantially flat bottom 13a and a peripheral groove 14 surrounding the bottom 13a of the recess.

Figure 4:
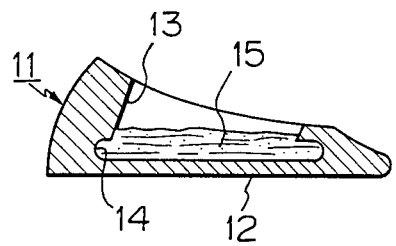

In the second step of the method in accordance with the first embodiment of the present invention, the main body 11 is fixed on a flat stand (not shown) with its face side 12 being in contact with the stand surface. Next, fluid crude FRP 15 is filled in the recess 13 to a proper level well above the groove 14 as shown in FIG. 4. Next, a metal or rubber mould 16 is inserted into the recess 13 to compress the fluid crude FRP 15 in the recess 13 as shown in FIG. 5.

Figure 5:
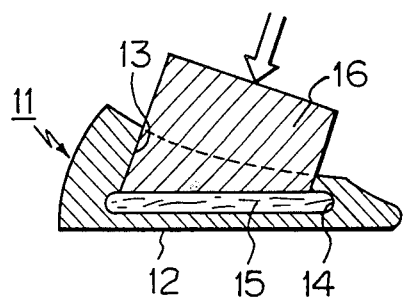

In the third step of the method in accordance with the first embodiment of the present invention, the fluid crude FRP 15 is subjected heating while keeping the compressed state in FIG. 5.

Figure 6:
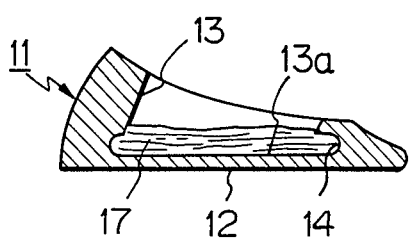
FIGS. 6 and 7 are side sectional views for showing some sequential steps in the other embodiment of the method of the present invention.
Figure 7:
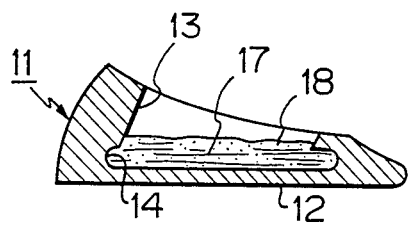

In the second step of the method in accordance with the second embodiment of the present invention, the main body 11 is also fixed on a flat stand (not shown) with its face side 12 being in contact with the stand surface. Next, proper amount of reinforcing fiberous material 17 is placed in the recess 13 as shown in FIG. 6, and the reinforcing fibrous material 17 is impregnated with liquid synthetic resin 18 as shown in FIG. 7. Thereafter hardening by heat under pressure is carried out in a manner substantially same as that shown in FIG. 5.

Fluid crude FRP 15 is used in the case of the first embodiment. Such crude FRP may be made up of, for example, superimposed sheets of reinforcing fibers impregnated with solution of epoxy resin or unsaturated polyester resin. When necessary, the resin may be incompletely hardened after impregnation to form prepregs or wetted states.

Carbon fibers, highly elastic aromatic polyamide fibers, glass fibers, boron fibers, silicon carbide fibers, alumina fibers or mixtures of at least two of these fibers may be used for reinforcement. As a substitute for plastic, proper metal may be used as a matrix for the fibers.

The fibrous material may take the form of textile cloths, a combination of cloths with rovings and mats.

In the product, the thickness of the face side should preferably be in a range from 0.5 to 3.0 mm, and more preferably from 1.0 to 2.0 mm. While the thickness of the FRP backing should preferably be in a range from 1.0 to 10.0 mm and more preferably from 3.0 to 6.0 mm.

A recess with a substantially flat bottom is shown in the drawings. However, the inner wall including the bottom may be roughened or provided with projections and/or ribs for stronger bonding of the FRP backing with the main body. Further, the peripheral groove to be made in the recess may be either continuous or discontinuous.

In accordance with the present invention, a part of the FRP backing in the recess is caught in the form of a flange in the peripheral groove in the main body and, as a consequence, presence of such a flange well fortifies bonding of the FRP backing to the main body.

We claim:

1. Method for producing an iron golf club head comprising the steps of
    forming a metallic main body having a rear recess in the surface opposite to the face side of said metallic main body and a peripheral groove surrounding the bottom of said rear recess,
    filling easily deformable crude resin containing reinforcing fiberous material into said recess and peripheral groove, and
    hardening said crude resin by application of heat under pressure.

2. Method as claimed in claim 1 in which said step of filling includes
    filling fluid FRP into said recess and peripheral groove.

3. Method as claimed in claim 1 in which said step of filling includes
    placing said reinforcing fibrous material in said recess and peripheral groove, and
    impregnating said reinforcing fibrous material with solution of crude resin.

4. Method as claimed in claim 1 in which said step of forming includes
    roughening the inner wall of said recess including said peripheral groove.

5. Method as claimed in claim 1 in which said step of forming includes
    forming projections on the inner wall of said recess.

6. Method as claimed in claim 1 in which said step of forming includes
    forming ribs on the inner wall of said recess.

7. Method as claimed in claim 1 in which said step of forming includes
    forming projections and ribs on the inner wall of said recess.

* * * * *